United States Patent [19]

Sherry

[11] Patent Number: 5,269,859

[45] Date of Patent: Dec. 14, 1993

[54] METHOD OF MEASURING LENGTH OF LAP JOINT BETWEEN TWO SHEETS OF MATERIAL

[76] Inventor: Donald E. Sherry, 1515 Hampton Rd., Rocky River, Ohio 44116

[21] Appl. No.: 884,395

[22] Filed: May 18, 1992

[51] Int. Cl.⁵ .............................................. B32B 31/00
[52] U.S. Cl. ....................................... 156/64; 156/35; 156/353
[58] Field of Search ................ 156/64, 73.4, 157, 202, 156/216, 306.6, 351, 360, 361, 378, 353, 502, 503, 504; 271/262, 263

[56] References Cited

U.S. PATENT DOCUMENTS

| | | | |
|---|---|---|---|
| 4,236,538 | 12/1980 | Foster et al. | 156/157 |
| 4,238,261 | 12/1980 | Tetro | 156/157 |
| 4,343,667 | 8/1982 | Hollis | 156/157 |
| 5,045,134 | 9/1991 | Schenker et al. | 156/351 |
| 5,085,719 | 2/1992 | Eck | 156/73.1 |

FOREIGN PATENT DOCUMENTS 0821197 4/1981 U.S.S.R. .............................. 156/353

Primary Examiner—David A. Simmons
Assistant Examiner—W. J. Matney, Jr.
Attorney, Agent, or Firm—Fay, Sharpe, Beall, Fagan, Minnich & McKee

[57] ABSTRACT

A method of measuring the length of a lap joint between sheets of material comprises the steps of transporting the sheets over a first roll and under a second roll. The rolls are a fixed distance apart. A first signal is generated when a second end of a first sheet passes a first measuring point which is located above the first roll. A second signal is generated when a first end of the second sheet passes a second measuring point which is located under the second roll. The number of revolutions of the first roll between the first and second signal are counted by a rotary encoder associated with the first roll. By comparing the actual number of pulses counted by the rotary encoder with a reference number of pulses which is determined by the number of the rotations of the first roll necessary to transport a given point from the measuring point above the first roll to the measuring point below the second roll, a length of a lap joint can be calculated. The calculation requires the subtracting of the actual number of pulses from the reference number of pulses, and converting the difference in pulses to a length measurement. An apparatus for carrying out the method comprises first, second and third rolls. At least one of the rolls has a rotary encoder associated therewith. A first sensor is located above the first roll and a second sensor is located below the second roll.

22 Claims, 2 Drawing Sheets

METHOD OF MEASURING LENGTH OF LAP JOINT BETWEEN TWO SHEETS OF MATERIAL

BACKGROUND OF THE INVENTION

1. Field of Invention

This invention pertains to the art of measuring lap joints between sheets of material, and most particularly to the art of rubber processing, such as tire building, where the length of such lap joint is important.

2. Description of Related Art

It is commonly known in the tire building industry to connect discrete sheets of material together via the use of a lap joint. Often, such lap joints are used with elastomeric tire components, such as liners or can also be used with reinforced components such as carcass plys or belts. Because a tire contains air at elevated pressures and undergoes rigorous use conditions, it is important that the lap joint holding portions of the tire together be secure. In order for the lap joint to be secure, the length of the lap joint must be sufficient such that the lap joint does not open, thereby releasing air to the atmosphere and deflating the tire. At the same time, if the lap joint is too large, having too large of a length, an undulation may appear in the tire's side wall. In addition, the cost of the tire goes up due to the increased amount of material with no corresponding increase in performance or benefit to the customer.

For this reason, in the process of manufacturing tire components, large sheets of liner compound, ply compound and the like are manufactured and carefully cut into proper lengths for the particular tire involved. During the tire manufacturing process, the individual sheets are attached to one another through a lap joint.

It has long been a need in the tire industry to develop an economical and accurate way of measuring and verifying the correct length of a lap joint. Although this need has been long recognized, to date, no economical automatic method has been developed. Instead, the inspection of a lap joint is typically made by a human tire builder as a tire is manufactured.

The present invention contemplates a new and improved method and apparatus of detecting and measuring the length of a lap joint. This method and apparatus is simple in design, effective in use, and overcomes the foregoing difficulties and others while providing better and more advantageous overall results.

SUMMARY OF THE INVENTION

In accordance with the present invention, a new and improved method and apparatus for measuring the length of a lap joint is provided. More particularly, in accordance with the invention, the method of measuring the length of a lap joint comprises transporting a first and second sheet over a first roll and under a second roll. The rolls are a fixed distance from each other and of known diameter. The rolls rotate as the sheets move through the rolls. The bottom surface of each of the sheets contacts an outer surface of the first roll and the top surfaces of each of the sheets contact an outer surface of the second roll. When a second end of a first sheet passes a first measuring point over a first roll, a first signal is generated. When a first end of a second sheet passes a second measuring point under a second roll, a second signal is generated. A rotary encoder mounted to the first roll counts an actual number of pulses between the first and second signals, the actual number of pulses are then compared to a predetermined reference number of pulses. The reference number of pulses is determined by the number of rotations of the first roll necessary to transport a detectable reference mark from the first measuring point to the second measuring point. Finally, the length of the lap joint is calculated by subtracting the actual number of pulses from the reference number of pulses and converting the difference in pulses to a length measurement. This length measurement is equivalent to the length of the lap joint.

According to another aspect of the invention, the method further comprises the step of indicating if slippage or slack occurs during the travel of said first and second sheets relative to said first and second rolls. This is accomplished by comparing the number of pulses generated by the encoder attached to the first roll with the number of pulses generated by an encoder attached to the second roll.

According to another aspect of the invention, the method further comprises compensating for slippage or slack by comparing the signals generated by the first encoder with the signals generated by the second encoder and using the result for the purpose of correcting the results obtained by use of the first encoder only.

According to a still further aspect of the invention, the generating of the first and second signals are by means of non-contacting sensors. The sensors can be of any non-contacting method, such as ultrasonic, electro-optical or capacitive.

According to a still further aspect of the invention, the signal representing a detected edge is processed to detect if an edge is a leading or trailing edge. By determining which condition exists, it is possible to measure lap joint width in cases where it is not known in which order a leading or trailing edge will be presented to the sensors.

According to another aspect of the invention is the use of a rotary encoder to generate pulses for the purpose of measuring the length of the lap joints.

According to another aspect of the invention is generating of the slippage or slack indicating pulses by means of a second rotary encoder.

According to a still further aspect of the invention, the method further comprises a third roll after the first and second rolls so that the second roll is between the first and third rolls. Typically, the third roll operates as an independent take up roll or as a drive roll to pull the sheets through the first and second rolls.

According to a still further aspect of the invention, the method further comprises the use of the second roll as the drive roll to pull the sheets by the first roll in circumstances when it is not practical to use a third roll as the drive roll.

According to a still further aspect of the invention, a method of measuring the length of a lap joint when the length of the sheets are predetermined comprises the steps of generating a first signal when a second end of a first sheet passes a first measuring point, generating a second signal when a second end of a second sheet passes said first measuring point, calculating an as-built length of said first sheet, said as-built length being a distance between said second ends of said first and second sheets and further being that length detectable from only one side of said sheets, and, calculating a length of a lap joint by subtracting said as-built length of said second sheet from said predetermined actual length of said second sheet.

According to a still further aspect of the invention, a method of measuring the length of a lap joint comprises the steps of transporting sheets over a first roll and under a second roll. The bottom surface of the sheets contact an outer surface of the first roll and the top surface of the sheets contacts an outer surface of the second roll. A first signal is generated when the second end of the first sheet passes a first measuring point. A second signal is generated when the first end of the second sheet passes a second measuring point. A third signal is generated when a second end of the second sheet passes a first measuring point. An actual length of the second sheet is calculated, the actual length being a distance between the first and second ends of the second sheet. An as-built length of the second sheet is calculated, the as-built length being a distance between the second end of the first sheet and the second end of the second sheet. Finally, the length of the lap joint is calculated by subtracting an as-built length of the second sheet from an actual length of the second sheet.

According to a still further aspect of the invention, the signal representing a detected edge is processed to detect if an edge is a leading or trailing edge. A leading edge is an edge facing the direction of travel, a trailing edge faces in the opposite direction. By determining which condition exists, it is possible to measure lap joint width in cases where it is not known in which order said leading or trailing edge will be presented to said sensors.

According to a still further aspect of the invention, an apparatus for measuring the length of a lap joint between two sheets of material comprises a first rotatable roll. The first roll has an outer surface. A second rotatable roll has an outer surface and is a fixed distance from the first roll. A first sensor is mounted above the first roll. The first sensor generates a first signal upon an occurrence of a second end of a first sheet passing under a first sensor. A second sensor mounted beneath a second roll generates a second signal upon an occurrence of a first end of a second sheet passing over the second sensor. A first rotary encoder associated with a first roll records revolutions of the first roll. Finally, a calculating means for calculating a distance between the second end of the first sheet and a first end of the second sheet does so. The distance is equal to the length of the lap joint between the first and second sheets.

It has further been considered a possibility that said first sensor be placed over the transport belt used to bring the material to the rollers. Such possibility will only be practical if the movement of the transport belt can be encoded, and if the precision of the transport belt is sufficient to eliminate the possibility of erroneous signals being generated, and if the accuracy of the transport belt is sufficient to keep the measured material within the measuring range of the non-contact sensors and, if a conductive surface is not required behind the material being measured.

It has further been considered a possibility that measurement of extreme bias cut materials may require said rollers be replaced by special belts. Special belts would offer the advantage of providing a flat surface from which to sense said bias cut edges. Such a requirement would arise only in cases wherein extreme bias cuts cannot be measured over rollers.

It has been considered that a further possibility is the controlling of slippage or slack of said first sheet and said second sheet relative to the actual rotation of said first roll and/or said second roll. This can be accomplished through the means of various commercially available technologies including, but not limited to hold down rolls, permanent magnet eddy current couplings, differential draw transmissions or harmonic drive draw transmissions.

One advantage of the present invention is the provision of a new method which economically and accurately can automatically detect, measure, and report the length of lap joints between sheets of material.

Another advantage of the invention is the fully automatic, mechanized nature of the detection and measurement technique and apparatus.

Another advantage of the invention is the relatively low cost of the measurement apparatus. The sensors, rolls, and other equipment required is relatively inexpensive compared to the alternative of a human measurement by the operator.

Another advantage of the invention is the use of non-contact sensors which will not acquire a build-up of contaminating materials typical to the environment in which the equipment will be operated.

Another advantage of the invention is the avoidance of the use of radioactive materials and their inherent safety and cost disadvantages.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein.

DESCRIPTION OF THE PREFERRED EMBODIMENT

Figure 1:
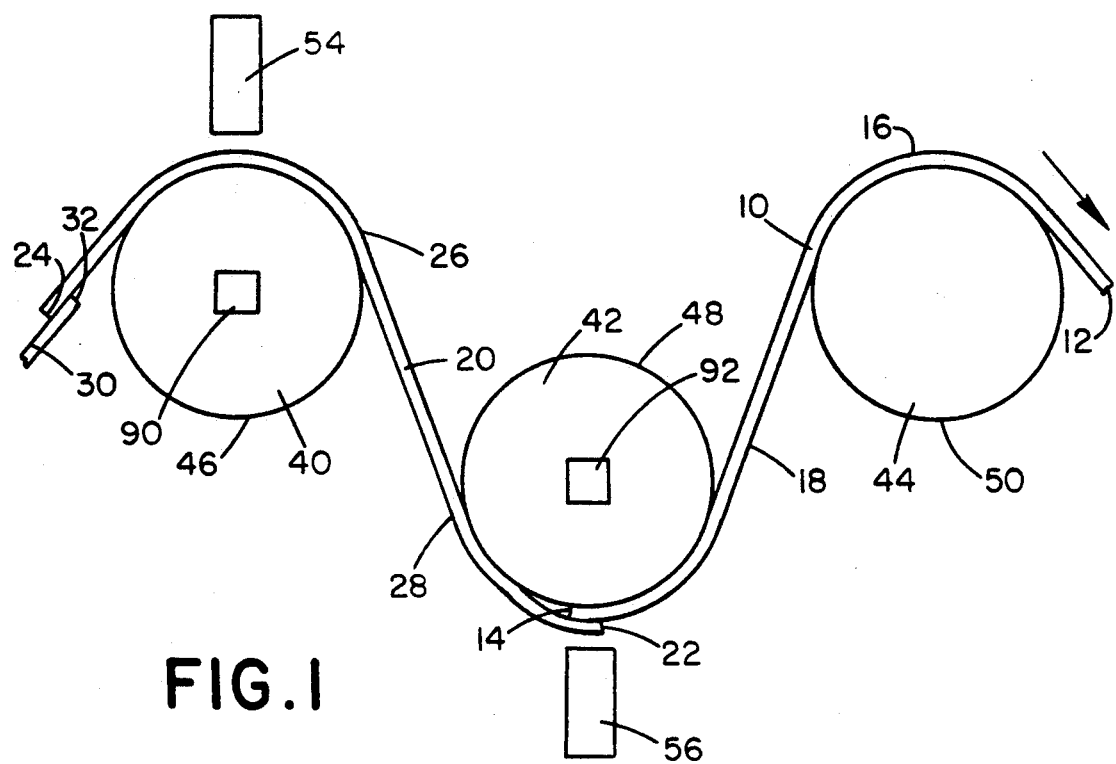
FIG. 1 is a schematic front view of an apparatus according to the invention.

Referring now to the drawings, wherein the showings are for purposes of illustrating a preferred embodiment of the invention only and not for purposes of limiting the same, FIG. 1 shows a first sheet 10, a second sheet 20, and a third sheet 30. These sheets are schematically represented, but typically can be any elastomeric, plastic, or other sheet-like material suitably connected together via a lap joint.

The first sheet 10 has a first end 12, a second end 14, a top surface 16 and a bottom surface 18. The second sheet 20 has a first end 22, a second end 24, a top surface 26, and a bottom surface 28. The third sheet 30 has similar elements, as do any succeeding sheets. In a typical application, the sheets 10, 20, 30 are threaded between a first roll 40, a second roll 42, and a third roll 44. The bottom surfaces 18, 28 of the sheets 10, 20 are in contact with an outer surface 46 of the first roll 40 and an outer surface 50 of the third roll 44. The top surfaces 16, 26 of sheets 10, 20 are in contact with an outer surface 48 of the second roll 42.

In a preferred embodiment, each of the rolls 40, 42, 44 rotate as the sheets 10, 20, 30 travel through the system.

Depending on the application, some of the rolls may be idler rolls, meaning they are not independently driven, but instead are rotated by the friction between the travelling sheets 10, 20, 30 and the outer surfaces 46, 48, 50 of the rolls 40, 42, 44.

Above the first roll 40 is a first sensor 54. A second sensor 56 is mounted beneath the second roll 42. Attached to the axle of the first roll 40 is a rotary encoder 90. Attached to the axle of the second roll 42 is a second rotary encoder 92.

Figure 2:
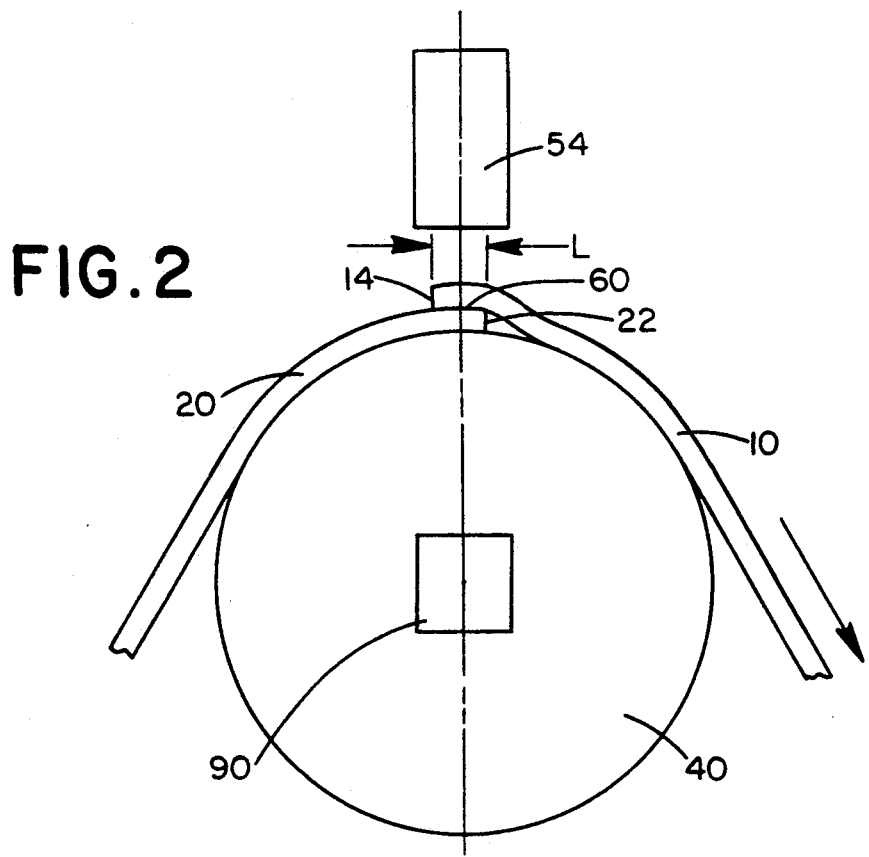
FIG. 2 is an enlarged schematic front view of a first roll and sheets of material.

With reference to FIG. 2, the lap length measuring system is shown with the first end 22 of the second sheet 20 and the second end 14 of the first sheet 10 located approximately above the center of the first roll 40. As can be clearly seen in the enlarged drawing, the overlap length L of the lap joint 60 is the distance between the second end 14 of the first sheet 10 and the first end 22 of the second sheet 20. If the overlap length L is too small, a gap may be built into the tire between the sheets 10, 20. If the sheets 10, 20 are made of a elastomeric liner material, such as chlorobutyl, a gap between the ends 14, 22 will allow the inflation air to escape through the other components of the tire, thereby causing the tire to deflate.

Figure 3:
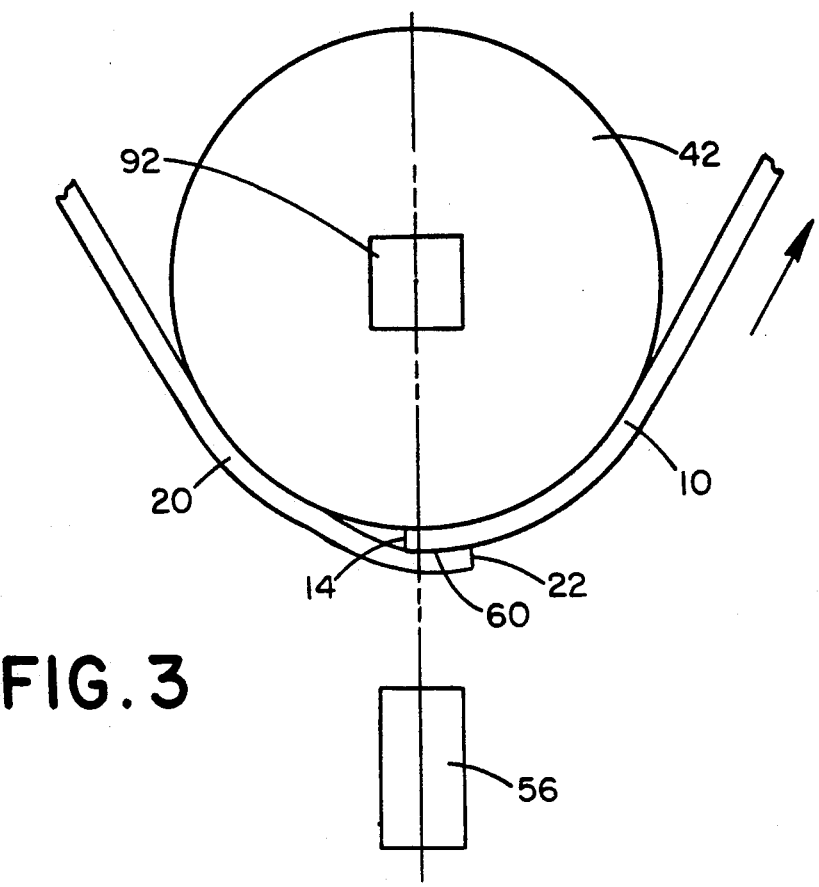
FIG. 3 is an enlarged schematic front view of a second roll of the invention.

With reference to FIG. 3, the lap joint 60 between the first and second sheets, the same lap joint 60 as described in FIG. 2, is again illustrated in FIG. 3. In FIG. 3, the lap joint 60 is shown at the bottom of the second roll 42.

With continuing reference to FIGS. 2 and 3, it is clear that the second end 14 of the first sheet 10 is easily detected by non-contact sensor 54. Likewise, in FIG. 3, the first end 22 of the second sheet 20 is easily detected by non-contact sensor 56. By sensing the passing of these edges past the respective sensors 54, 56, the length L of lap joint 60 can be calculated by the following method.

With reference to FIG. 1, the distance between the first roll 40 and the second roll 42 is a fixed distance. Therefore, assuming no slippage, slack or stretch, one can determine the number of revolutions of the first roll 40 required to transport a given point on the material from the first measuring point above the first roll 40 the second measuring point under the second roll 42. This number of revolutions can be transformed into a linear distance by knowing the diameter of the first roll 40 and the exact number of pulses the first rotary encoder 90 generates per revolution. The number of revolutions of the first roll 40 are indicated by the first encoder 90. Any commonly available rotary encoder is suitable for this portion of the invention, as long as it is chosen with common engineering judgment and is effective to accomplish the precision and working conditions of the specific case involved.

As the sheets 10, 20, 30 are transported over the first roll 40, under the second roll 42, and over the third roll 44, a first signal is generated by a first sensor 54 when the second end 14 of the first sheet 10 passes the first measuring point at sensor 54. A second signal is generated when the first end 22 of the second sheet 20 passes a second measuring point, namely measured by second sensor 56.

Having previously determined distance between first and second measuring points at sensors 54, 56 enables one to calculate the number of revolutions of the first roll 40 to transport the second end 14 of the first sheet 10 to the second measuring point at sensor 56. When the second sensor 56 senses the presence of the first end 22 of the second sheet 20, the first roll 40 has rotated a number of revolutions less than that number of revolutions required to move the second end 14 of the first sheet 10 to the second measuring point. It is this difference in distance which is equal to the length L of the lap joint 60. Therefore, by counting the actual number of pulses generated by the first rotary encoder 90 between the first signal (when the second end 14 passes sensor 54) and the second signal (when the first end 22 passes the second sensor 56), and comparing the actual number of pulses to the predetermined reference number of pulses, a length of a lap joint can be calculated. Specifically, the lap joint length L is equal to the difference between the reference number of pulses and the actual number of pulses.

While it is believed to be possible that the mechanism can be constructed so there is no slippage between the sheets 10, 20 and the rolls 40, 42, the second rotary encoder 92 can be used to indicate slippage or slack. Depending on the application, these rotary encoders can be utilized to account for any slippage or slack between the sheets 10, 20 and the rolls 40, 42. For example, if the first roll 10 rotates a different amount of revolutions as does second roll 20 for the same sheet, and the diameters of the first and second rolls 40, 42 are the same, then slippage or slack must have occurred.

In the preferred embodiment, the sensors are non-contacting. Preferably, these non-contacting sensors are capacitive, electro-optical or ultrasonic.

In the preferred embodiment, the signal processing will generate a signal indicating whether a leading or trailing edge has been detected by the first sensor 54. The edge detection technique will use the signal indicating whether a leading or trailing edge has been detected to correctly process the signal for accurate determination of the edge position. The length calculating technique will include the ability to correctly measure the lap joint length regardless of whether a leading or trailing edge is presented to the first sensor.

According to another embodiment of the invention, a situation in which each sheet has a predetermined actual length, the same physical structure can be utilized to calculate the length of a lap joint. In this case, since the actual length of each sheet is already known, the only measurement of interest is the actual, as-built length of the individual sheets. In such case, the sheets 10, 20, 30 are threaded over the first roll 40 and under the second roll 42 as before. A first signal is generated by the first sensor 54 when the second end 14 of the first sheet 10 passes a first measuring point, i.e., sensor 54. Pulses, generated by the first rotary encoder 90, are counted as the first roll 40 rotates and the sheets 10, 20, 30 progress toward the second roll 42. A second signal is generated when the second end 24 of the second sheet 20 passes the first measuring point at the first sensor 54. The number of pulses output by the first rotary encoder 90 transpiring between these two events correspond to a shorter length than the predetermined actual length of the sheets. This discrepancy is equal to the length L of the lap joint 60. Therefore, in the case where the sheets are of uniform known lengths, the above-described measuring method can calculate the length of a lap joint.

Figure 4:
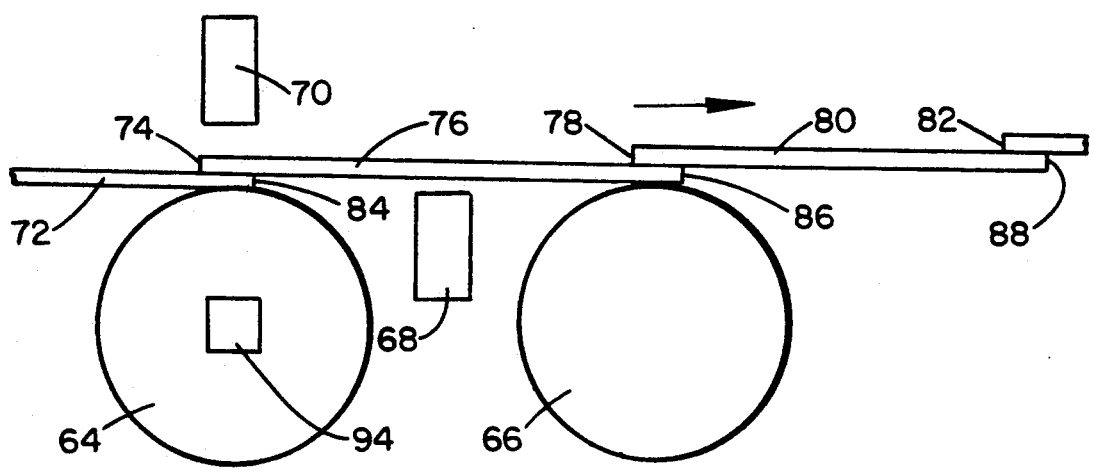
FIG. 4 is a schematic front view of another embodiment of the invention.

The above-described measurement techniques can be adapted to a variety of embodiments. For example, with reference to FIG. 4, the sheets can be made to pass above a single or a plurality of rolls. The sensors can be mounted in between the rolls on both the top and bottom surfaces, obviating any requirement that the sheets bend. This embodiment may be necessary if a non-elastomeric material is used in the sheets. Further, the invention has been described with the lap joint consistently formed by a second end 14 of a first sheet 10 being raised above and fixed to a first end 22 of a second sheet 20. This orientation can be reversed, or can be alternated, or can be random.

Another embodiment of the measurement technique is disclosed with reference to FIG. 1. This alternate measurement technique actually involves transporting the sheets 10, 20, 30 over first and second rolls 40, 42. A first signal is generated when the second end 14 of the first sheet 10 passes a first measuring point at sensor 54. A second signal is generated when the first end 22 of the second sheet 20 passes a second measuring point at sensor 56. A third signal is generated when the second end 24 of the second sheet 20 passes the first measuring point at sensor 54. By obtaining these measurements, and correlating them to the pulses output by a rotary encoder, an actual length of the second sheet 20 can be calculated, this actual length being the distance between the first end 22 and the second end 24 of the second sheet 20. Next, an "as-built" length of the second sheet 20 is calculated, the as-built length being the distance between the second end 14 of the first sheet 10 and the second end 24 of the second sheet 20. Next, the length of a lap joint joining the first sheet 10 and the second sheet 20 can be calculated by subtracting the as-built length of the second sheet from the actual length of the second sheet.

According to a still further aspect of the invention, an apparatus for measuring the length of a lap joint between two sheets of material is shown in FIG. 1. In general schematic form, the apparatus comprises first and second rotatable rolls 40, 42, having outer surfaces 46, 48. The first roll 40 is a fixed distance from the second roll 42. A first sensor 54 is mounted directly above the first roll 40. The first sensor 54 is able to generate a signal upon the occurrence of an event, such as the passing of an end of material underneath the sensor. In the preferred embodiment, several sensors will be utilized to read across the width of the material to be measured, the distance into the page when viewing FIG. 1. A second sensor 56 is mounted beneath the second roll 42. The second sensor generates a second signal upon the occurrence of an event, such as the passing of an end of a sheet past it. As with the first sensor 54, in the preferred embodiment of second sensor 56, several sensors will read across the width of the material to be measured. A first rotary encoder 94 is associated with the first roll 54. The rotary encoder, or similar means to count revolutions of the first roll 40, counts revolutions of the first roll as the sheets 10, 20, 30 pass over its outer surface. Finally, the apparatus comprises calculating means using the output of the sensor signals and the rotary encoders to calculate a distance between the second end 14 of the first sheet 10 and the first end 22 of the second sheet 20. This distance is equal to the length L of the lap joint 60 between the first and second sheets 10, 20, this calculating means can be of any acceptable type chosen with commonly accepted engineering standards.

Variations of this measurement technique could be formulated by rearranging the method of forming the lap splice in the sheets or by the arrangement of the rolls. For example, with reference to FIG. 4, an alternate embodiment is shown. In this embodiment, rolls 64, 66 transport sheets 72, 76, 80 from left to right across the page. The second ends 74, 78, 82 of the sheets 72, 76, 80 are detected by a sensor 70. The first ends 84, 86, 88 of the sheets 72, 76, 80 are detected by sensor 68. Through counting and recording the revolutions of the rolls, as well as the passing of the ends 74, 78, 82, 84, 86, 88, the length of the lap joints between the respective sheets 72, 76, 80, 82 can be determined.

The invention has been described with reference to preferred and alternate embodiments. Obviously, modifications and alterations will occur to others upon the reading and understanding of this specification. It is intended to include all such modifications and alterations insofar as they come within the scope of the appended claims or the equivalents thereof.

Having thus described the preferred embodiments, the invention is claimed as follows:

1. A method of measuring the length of a lap joint, said lap joint joining together a first and second sheet, each of said first and second sheets also having first and second ends and top and bottom surfaces, said bottom surface at said second end of said first sheet affixed to said top surface at said first end of said second sheet, thus forming said lap joint, said method comprising the steps of:

transporting said sheets over a first roll and under a second roll, said rolls being a fixed distance apart, said rolls rotating as said sheets move through said rolls, said bottom surface of said sheets contacting an outer surface of said first roll and said top surface of said sheets contacting an outer surface of said second roll;

generating a first signal when said second end of said first sheet passes a first measuring point;

generating pulses, said pulses being generated by rotation of said first roll driving a first rotary encoder attached to said first roll;

generating a second signal when said first end of said second sheet passes a second measuring point;

counting an actual number of pulses generated by said first encoder between said first and second signals;

comparing said actual number of pulses to a predetermined reference number of pulses, said reference number of pulses determined by the number of rotations of said first roll required to transport said second end of said first sheet from said first measuring point to said second measuring point; and, calculating a length of a lap joint by subtracting said actual number of pulses from said reference number of pulses and converting said difference in pulses to a length measurement;

generating pulses, said pulses being generated by rotation of said second roll driving a second rotary encoder attached to said second roll;

calculating means for compensating for slippage or slack of said first and second sheets relative to said first and second rolls using pulses generated by said first and second encoders.

2. The method of claim 1 further comprising, prior to calculating a length of a lap joint, the step of:

compensating for slippage or slack or said and second sheets relative to said first and second rolls by comparing pulses generated by said first and second encoders.

3. The method of claim 1 wherein said generating of said first and second signals is by non-contacting sensors.

4. The method of claim 3 wherein said non-contacting sensors are capacitive sensors.

5. The method of claim 3 wherein said non-contacting sensors are electro-optical sensors.

6. The method of claim 3 wherein said non-contacting sensors are ultrasonic sensors.

7. The method of claim 1 further comprising the step of, before generating a first signal:
determining a direction of an edge of a second end of said first sheet, said direction being a condition whereby said edge faces toward or away from the direction of travel of said sheet.

8. The method of claim 1 further comprising, prior to calculating a length of a lap joint,
accounting for slippage or slack of said first and second sheets relative to said first and second rolls.

9. The method of claim 8 wherein said slippage or slack accounting means comprises:
comparing said number of pulses generated by said first rotary encoder with said number of pulses generated by said second rotary encoder associated with said first and second rolls.

10. The method of claim 1 further comprising:
a third roll, said second roll between said first and third rolls, said third roll being a driver roll.

11. A method of measuring the length of a lap joint, said lap joint joining together a first and second sheet of material, said first and second sheets each having a predetermined actual length, each of said first and second sheets also having first and second ends and top and bottom surfaces, said bottom surface at said second end of said first sheet affixed to said top surface at said first end of said second sheet, thus forming said lap joint, said method comprising the steps of:
generating a first signal when said second end of said first sheet passes a first measuring point;
generating pulses, said pulses being generated by a rotary encoder affixed to a first roll;
generating pulses, said pulses being generated by rotation of a second roll driving a second rotary encoder attached to said second roll;
generating a second signal when said second end of said second sheet passes a second measuring point;
calculating an as-built length of said first sheet by counting said pulses between said first and second signals and converting said number of pulses into a length measurement, said as-built length being a distance between said second ends of said first and second sheets; and,
calculating a length of a lap joint by subtracting said as-built length of said second sheet from said predetermined actual length of said second sheet.

12. The method of claim 11 further comprising, while calculating a length of a lap joint:
compensating for slippage or slack of said first and second sheets relative to said first and second rolls by comparing pulses generated by said first and second encoders.

13. The method of claim 11 wherein said generating of said first and second signals is by non-contacting sensors.

14. The method of claim 11 further comprising:
a third roll, said second roll between said first and third rolls, said third roll being a driver roll.

15. A method of measuring the length of a lap joint, said lap joint joining together a first and second sheet of material, said first and second sheets each having an unknown actual length, each of said first and second sheets also having first and second ends and top and bottom surfaces, said bottom surface of said second end of said first sheet affixed to said top surface of said first end of said second sheet, thus forming said lap joint, said method comprising the steps of:
transporting said sheets over a first roll and under a second roll, said bottom surface of said sheets contacting an outer surface of said first roll and said top surface of said sheets contacting an outer surface of said second roll;
generating a first signal when said second end of said first sheet passes a first measuring point;
generating pulses, said pulses being generated by a rotary encoder affixed to said first roll;
generating pulses, said pulses being generated by rotation of said second roll driving a second rotary encoder attached to said second roll;
generating a second signal when said first end of said second sheet passes a second measuring point;
generating a third signal when said second end of said second sheet passes said first measuring point;
calculating an actual length of said second sheet by counting said pulses between said second and third signals and converting said number of pulses into a length measurement, said actual length being a distance between said first and second ends of said second sheet;
calculating an as-built length of said second sheet by counting said pulses between said first and third signals and converting said number of pulses into a length measurement, said as-built length being a distance between said second end of said second sheet and said second end of said first sheet; and,
calculating a length of a lap joint by subtracting said as-built length of said second sheet from said actual length of said second sheet.

16. The method of claim 15 further comprising, prior to calculating a length of a lap joint, the step of:
compensating for slippage or slack of said first and second sheets relative to said first and second rolls by comparing pulses generated by said first and second encoders.

17. The method of claim 15 wherein said generating of said first and second signals is by non-contacting sensors.

18. The method of claim 15 further comprising:
a third roll, said second roll between said first and third rolls, said third roll being a driver roll.

19. An apparatus for measuring a length of a lap joint between two sheets of material, said apparatus comprising:
a first rotatable roll, said first roll having an outer surface;
a second rotatable roll, said second roll having an outer surface, said second roll being a fixed distance from said first roll;
a first sensor mounted above said first roll, said first sensor generating a first signal upon an occurrence of a second end of a first sheet passing under said first sensor;
a second sensor mounted beneath said second roll, said second sensor generating a second signal upon an occurrence of a first end of a second sheet passing over said second sensor;
determining means for determining the direction of the edge being detected;

a first rotary encoder associated with said first roll, said first rotary encoder recording revolutions of said first roll;

a second rotary encoder associated with said second roll, said second rotary encoder recording revolutions of said second roll; and, calculating means for calculating a distance between said second end of said first sheet and said first end of said second sheet, said distance being equal to a lap joint between said first and second sheets.

20. The apparatus of claim 19 further comprising:
means for compensating for slippage or slack of said first and second sheets relative to said first and second rolls.

21. The method of claim 1 wherein said pulses are generated by a rotary encoder associated with said first roll.

22. The method of claim 7 further comprising, before the step of determining a direction of an edge;
assigning a direction signal to said generated signals.

* * * * *